United States Patent
Choi et al.

(10) Patent No.: US 6,175,218 B1
(45) Date of Patent: Jan. 16, 2001

(54) POWER FACTOR CORRECTION (PFC) CONTROLLER

(75) Inventors: Nak-Choon Choi; Kyung-Hee Jang; Maeng-Ho Seo, all of Kyungki-do (KR)

(73) Assignee: Fairchild Korea Semiconductor Ltd. (KR)

( * ) Notice: Under 35 U.S.C. 154(b), the term of this patent shall be extended for 0 days.

(21) Appl. No.: 09/320,298

(22) Filed: May 26, 1999

(30) Foreign Application Priority Data

May 29, 1998 (KR) .................................. 98-19756

(51) Int. Cl.[7] .............................. G05F 1/10; H02M 7/06
(52) U.S. Cl. .............................. 323/222; 363/81; 363/89
(58) Field of Search .................................. 323/222, 284, 323/282, 285, 288; 363/89, 80, 81, 84, 124, 97, 131

(56) References Cited

U.S. PATENT DOCUMENTS 5,359,281 * 10/1994 Barrow et al. ........................ 323/284

* cited by examiner

*Primary Examiner*—Peter S. Wong
*Assistant Examiner*—Pajnikant B Patel
(74) *Attorney, Agent, or Firm*—Blakely Sokoloff Taylor & Zafman

(57) ABSTRACT

Disclosed is a Power Factor Correction (PFC) controller which comprises a boost converter, an error amplification unit, a calculator, and a switching driver. The error amplification unit reduces the error voltage of the output voltage of the boost converter to a specific reference voltage. The calculator receives first and second input voltages proportional to the input power of the converter and the output voltage of the error amplification unit, and outputs the voltage proportional to the first input voltage and the output voltage of the error amplification unit and inversely proportional to the second input voltage. The switching driver controls the switch to OFF when the voltage which detects the current flowing to switch of the boost converter becomes equal to the output voltage of the calculator, and controls the switch to ON when the zero current of the coil of the boost converter is detected.

2 Claims, 6 Drawing Sheets

POWER FACTOR CORRECTION (PFC) CONTROLLER

BACKGROUND OF THE INVENTION (a) Field of the Invention

The present invention relates to a power factor correction (PFC) controller. More specifically, the present invention relates to a boundary mode PFC controller using a boost converter.

(b) Description of the Related Art

FIG. 1 shows a schematic of conventional boundary mode PFC controller using a boost converter, comprised of a boost converter 10 and a switching controller 20. The boost converter 10 rectifies input AC power and generates rectified power voltage Vs, and outputs a voltage Vout to a load part according to the operation of a switch (a metal oxide semiconductor field effect transistor or MOSFET). The switching controller 20 controls the switch of the boost converter 10. The switching controller 20 detects a fluctuation of input voltage or output voltage and controls the switch, such that the output voltage of the boost converter 20 is regulated to a specified value.

Referring to FIG. 1, when input voltage is assumed to be increased, the voltage Vm1, divided from the voltage Vs by the resistors R3 and R4, is increased, and accordingly, the output voltage Vmo of a multiplier 23 is also increased. Therefore, the point at which the voltages Vmo and Vcs provided to a comparator becomes equal is delayed, and hence the ON interval of the switch is increased. Hence, the output voltage Vout of the boost converter 10 is increased.

When the output voltage Vout of the boost converter 10 is increased, output voltage Vm2 of the error amplifier 21 is reduced, and an output voltage Vm2−Vref of subtracter 21 is reduced. Hence, the output voltage Vmo of the multiplier is reduced.

In the boundary mode PFC controller, when the input voltage is increased, the multiplier output voltage Vmo is momentarily increased, but the subtracter output voltage Vm2−Vref provided to the multiplier 23 is reduced due to the increase in the boost converter 10 output voltage, and the multiplier output voltage Vmo is reduced. Therefore, the multiplier output voltage Vmo continues to be constant, independent of the increase in input voltage, and the boost converter 10 output voltage Vout is regulated.

That is, as shown in FIG. 2, when the input voltage is increased and the voltage Vm1 is increased to Vm1', the output voltage Vm2 of the error amplifier 21 is reduced to Vm2', and eventually, the output voltage Vmo of the multiplier 23 is maintained to be constant.

However, in the prior art boundary mode PFC controller, when the input voltage is highly increased more than a specified voltage, the output voltage Vm2 of the error amplifier is increased to be higher than the reference voltage Vref, and the output voltage of boost converter 10 is no longer regulated. That is, in the prior art, the fluctuation range of the input voltage is limited by the reference voltage Vref.

SUMMARY OF THE INVENTION

It is an object of the present invention to provide a boundary mode PFC controller having a minimal limitation in the fluctuation range of the input voltage.

In one aspect of the present invention, the PFC controller comprises a converter, an error amplification unit, a calculator, a comparator, a zero current detection unit, and a switching driver.

The converter comprises a transformer coupling the primary coil to input voltage, a switch controlling the current flowing to the primary coil, and a first diode and a first capacitor rectifying the output voltage of the primary coil and supplying the rectified voltage to the load. The first diode, the first capacitor, and the switch configure a boost converter, and the switch is a MOSFET. The converter may further comprise a second diode coupled to one end of the second coil of the transformer, and a first resistor and a second capacitor coupled in series to between the second diode and the ground.

The error amplification unit comprises an error amplifier amplifying the difference between a voltage proportional to the output voltage of the converter and a first reference voltage, and a subtracter subtracting the output voltage of the error amplifier from a second reference voltage. The first reference voltage may be equal to second reference voltage.

The calculator receives a first and a second input voltages proportional to the input voltage of the converter and receiving the output voltage of the subtracter as inputs, and outputs the voltage proportional to the first input voltage and the output voltage of the subtracter and inversely proportional to the second input voltage. The first input voltage may be obtained by dividing the input voltage of the converter by the second and third resistors, and the second input voltage is obtained by dividing the voltage charged in the second capacitor by a specific value.

The comparator compares the voltage which detects the current flowing to the switch with the output voltage of the calculator. The zero current detection unit comprises a zero current detector comparing the voltage of the back electromotive force of the secondary coil of the transformer with a third reference voltage and detecting the zero current of the coil. The zero current detection unit may further comprise a clamping circuit clamping the back electromotive force voltage of the secondary coil of the transformer.

The switching driver controls the switch to OFF when the output voltage of the calculator becomes equal to the voltage which detects the current flowing to the switch, and controls the switch to ON when the switching driver detects the zero current of the secondary coil of the transformer. The switching driver may be comprised of: an R-S latch circuit, receiving the output voltage of the comparator through the reset terminal, and receiving the inverted output voltage of the zero current detector through the set terminal; a logical NOR gate, receiving the output voltage of the zero current detector and the output voltage of the R-S latch circuit; and a driver, controlling the switch to ON and OFF according to the output signal of the logical NOR gate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 3:
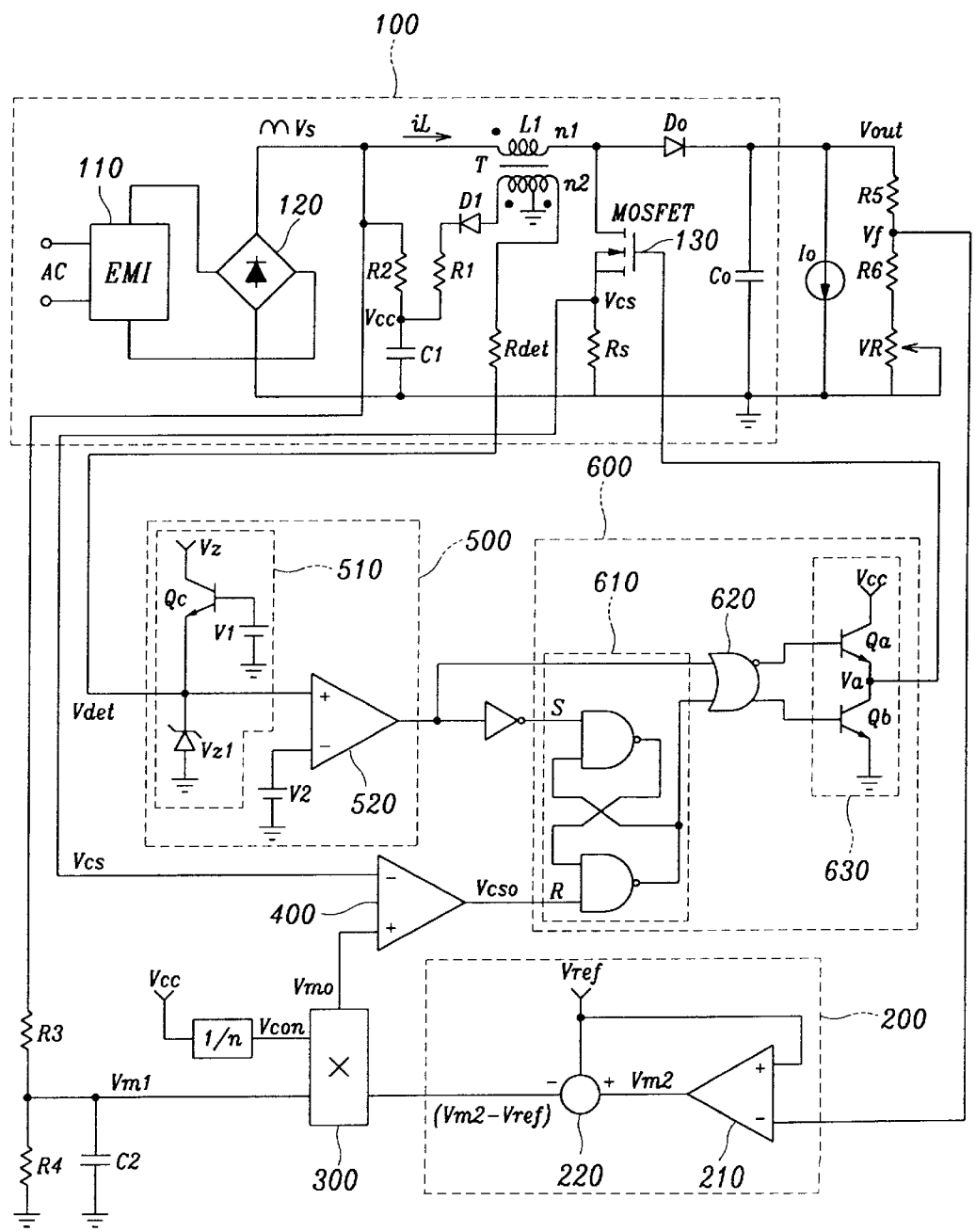
FIG. 3 is a schematic diagram of a boundary mode PFC controller according to an embodiment of the present invention.

FIG. 3 shows a schematic diagram of a boundary mode PFC controller according to an embodiment of the present invention comprising a boost converter 100, an error amplification unit 200, a calculator 300, a comparator 400, a zero current detection unit 500, and a switching driver 600.

The boost converter 100 comprises: an Electro Magnetic Interface (EMI) filter 110 which removes electromagnetic interference generated in the input AC voltage; a rectifier 120 which rectifies the input AC voltage and outputs rectified power voltage Vs; a transformer T; diodes D0 and D1; capacitors C0 and C1; resistors R1, R2, Rs, and Rdet; and a switching MOSFET 130. A primary coil L1 of the transformer, the diode D0, the capacitor C0, and the switching MOSFET 130 configure a boost converter. The center of the secondary coil of the transformer T is grounded, and one end of the secondary coil is coupled to the resistor R1 through the diode D1. The resistor R1 is coupled to a node between the resistor R2 and the capacitor C1.

A source of the switching MOSFET 130 is coupled to ground through the resistor Rs, and an inverting input terminal of the comparator 400 is coupled to the source of the switching MOSFET.

The error amplification unit 200 comprises: an error amplifier 210 which receives the voltage Vf divided from an output voltage Vout of the boost converter 100 through an inverting input terminal, and a reference voltage Vref through a noninverting input terminal; and a subtracter 20 which subtracts of the output voltage Vm2 of the error amplifier 210 from the reference voltage Vref.

The calculator 300 receives the output voltage Vm2−Vref of the subtracter 220, a voltage Vm1 divided from the input voltage Vs, and a voltage Vcon as input signals, and outputs a voltage Vmo which can be obtained from Equation 1:

$$Vmo = \frac{K \cdot Vm1 \cdot (Vm2 - Vref)}{Vcon},  \quad \text{Equation 1}$$

where, K is some constant to be defined later, and the Vcon is a voltage obtained by dividing the charged voltage Vcc in capacitor C1 by a specified constant 'n'.

The charged voltage Vcc in the capacitor C1 is obtained by Equation 2:

$$Vcc = \frac{n2}{n1} \cdot |Vs|,  \quad \text{Equation 2}$$

where, n1 and n2 are the turn numbers of the primary and secondary coils of the transformer T, respectively, and, |Vs| is a root mean square value of Vs.

The comparator 400 receives the output voltage Vmo of the calculator 300 through a noninverting input terminal, and the voltage Vcs proportional to the current flowing to the switching MOSFET 130 through an inverting input terminal, and outputs a voltage Vcso.

The zero current detection unit 500 comprises: a clamping circuit 510 which clamps a voltage Vdet detected by a resistor Rdet coupled to the secondary coil of the transformer; and a zero current detector 520 which receives the clamped voltage through a noninverting input terminal, and the reference voltage V2 through an inverting input terminal.

The switching driver 600 comprises: an R-S latch 610 which receives the inverted output voltage of the zero current detector 520 through a set S terminal, and the output voltage Vcso of the comparator 400 through a reset R terminal; a logical NOR gate 620 which receives the output voltages of the R-S latch 610 and the zero current detector 520 as input signals and executes a logical NOR operation; and a driver 630 which controls the MOSFET to ON or OFF according to the output signal of the logical NOR gate.

Figure 4:
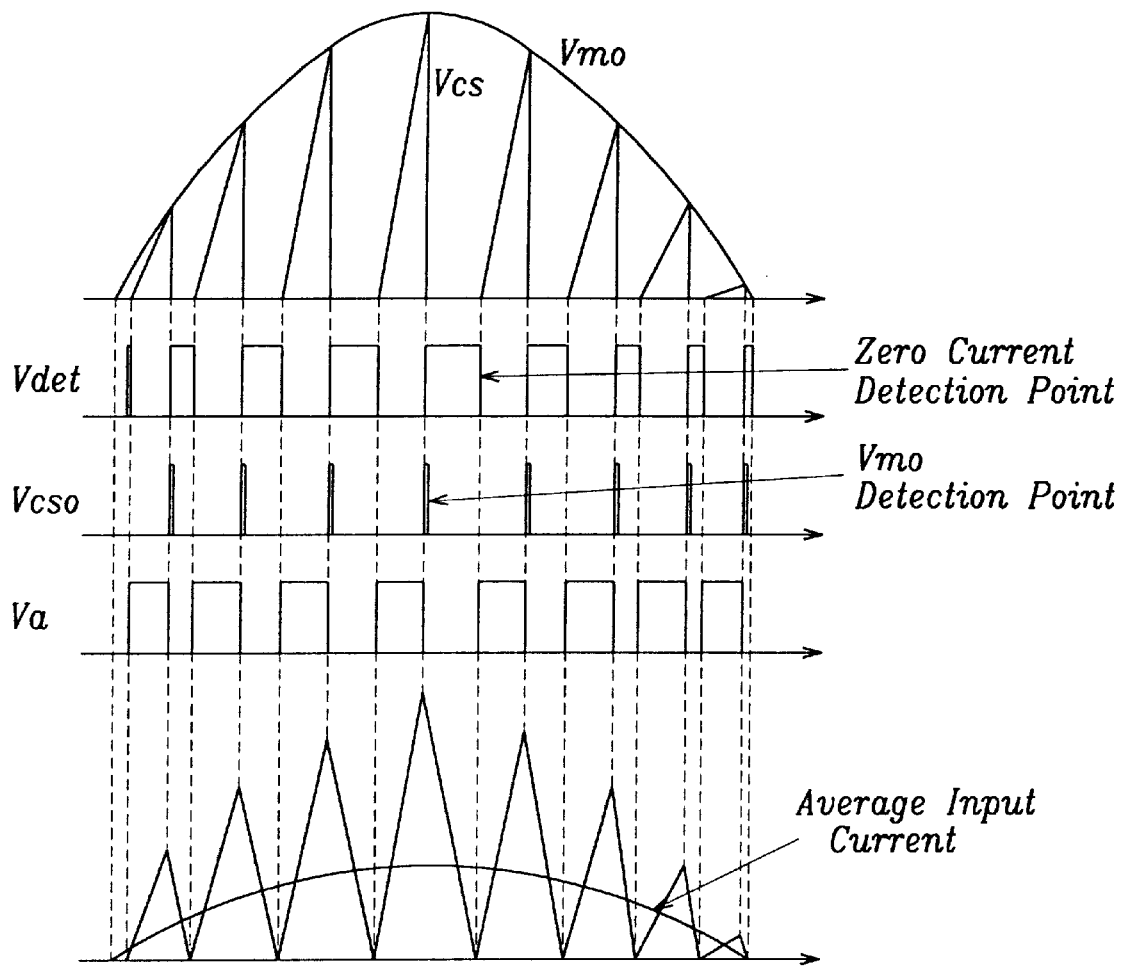
FIG. 4 illustrates waveforms describing the operation of the embodiment of the present invention.

Referring to FIGS. 3 and 4, the operation of the boundary mode PFC controller according to an embodiment of the present invention will now be described.

As shown by Equation 1, the output voltage Vmo of the calculator 300 is proportional to the voltage Vm1 divided from the input voltage Vs. Therefore, the waveforms of the voltage Vmo have identical phase with those of the input voltage Vs.

When the switching MOSFET is ON, the current flowing to the primary coil of the transformer is almost linearly increased, and accordingly, the detection voltage Vcs is almost linearly increased, as shown in FIG. 4. When the detection voltage Vcs is increased to be equal to the voltage Vmo, the comparator 400 outputs a pulse voltage Vcso. Therefore, the R-S latch 610 is reset, such that the output voltage Va of the driver 630 becomes low, and the switching MOSFET is controlled to OFF.

When the switching MOSFET is controlled to OFF, back electromotive force is induced to the primary coil of the transformer, and therefore the voltage Vdet becomes high voltage as shown in FIG. 4. When the switching MOSFET is controlled to OFF, the current flowing to the primary coil is almost linearly reduced, and finally, the current hardly flows at all. When the current is not flowing (i.e., at the zero current), the voltage Vdet becomes almost 0 as shown in FIG. 4, and the zero current detector 520 outputs high voltage Va. Since the output voltage of the zero current detector 520 is supplied through a set terminal of the R-S latch, the R-S latch is set, and the output voltage Va of the driver 630 becomes high. Therefore, the switching MOSFET 130 is controlled to ON again, and the above process is repeated.

Figure 5:
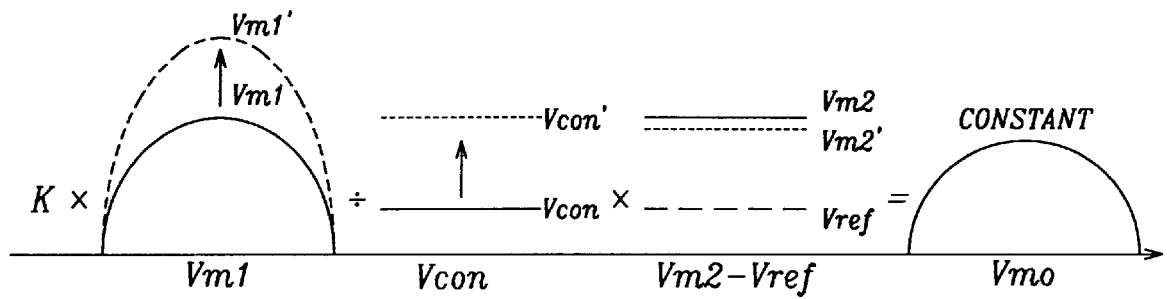
FIG. 5 illustrates the effect on a waveform when the input voltage is fluctuated in the embodiment of the present invention.

Next, the operation of the present invention will be described when the input voltage is fluctuated referring to FIGS. 3 and 5.

If the input voltage Vs is assumed to be increased, the voltage Vm1 obtained by dividing the input voltage Vs by the resistors R3 and R4 is increased to Vm1', and as shown by Equation 2, the voltage Vcc stored in the capacitor C1 is also increased, thereby, the voltage Vcon is increased to Vcon'.

Since the output voltage Vm0 of the calculator 300 is proportional to voltage Vm1' and inversely proportional to Vcon' as shown by Equation 1, the output voltage of the calculator can be regulated with a small fluctuation of the output voltage Vm2 of the error amplifier 210.

Figure 1:
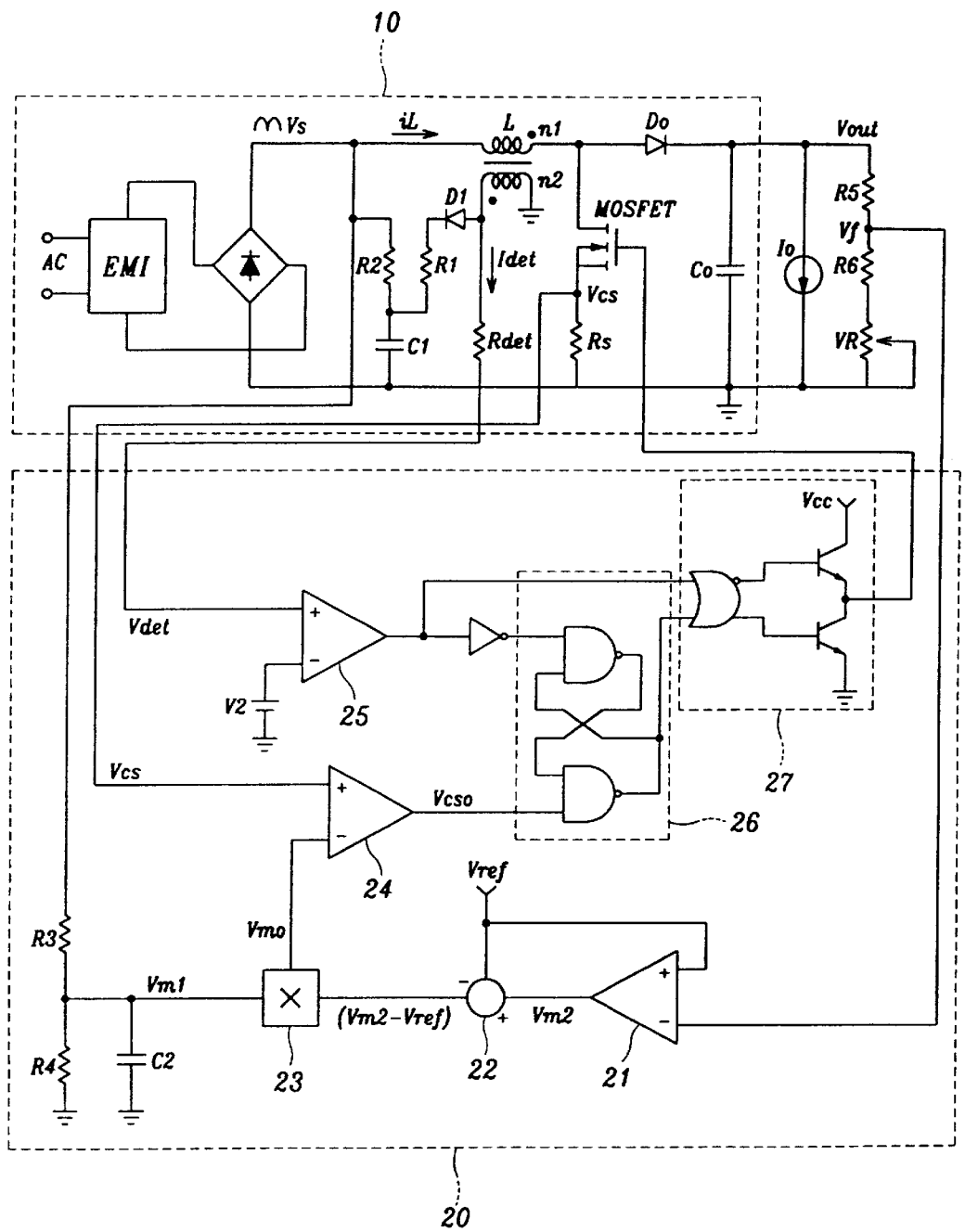
FIG. 1 is a schematic diagram for a conventional boundary mode PFC controller.
Figure 2:
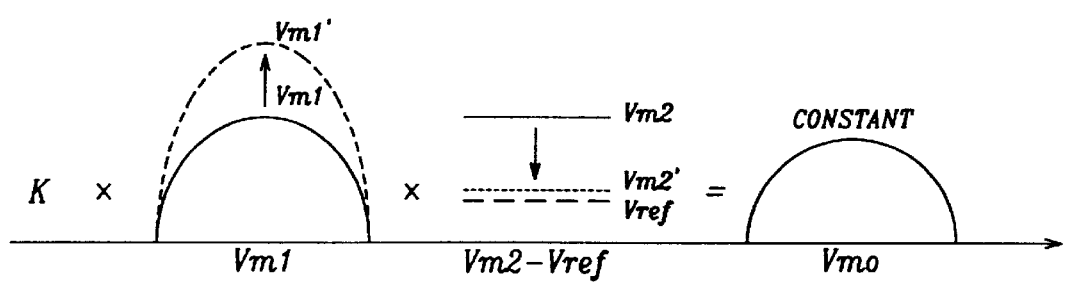
FIG. 2 illustrates the effect on a waveform when the input voltage is fluctuated in the circuit of FIG. 1.

In other words, the voltage Vm1 which detects the fluctuation quantity of the input voltage Vs is compensated by the voltage Vcon which functions as a feedforward, and the fluctuation quantity of the output voltage Vm2 of the error amplifier 210 feedback-controlling the output voltage Vmo of the calculator is reduced, when compared with the conventional PFC controller in FIG. 1. Therefore, the calculator 300 can stably regulate the output voltage Vout with regard to wide ranges of input voltages having few limitations.

Next, the calculator according to an embodiment of the present invention will be described.

Figure 6:
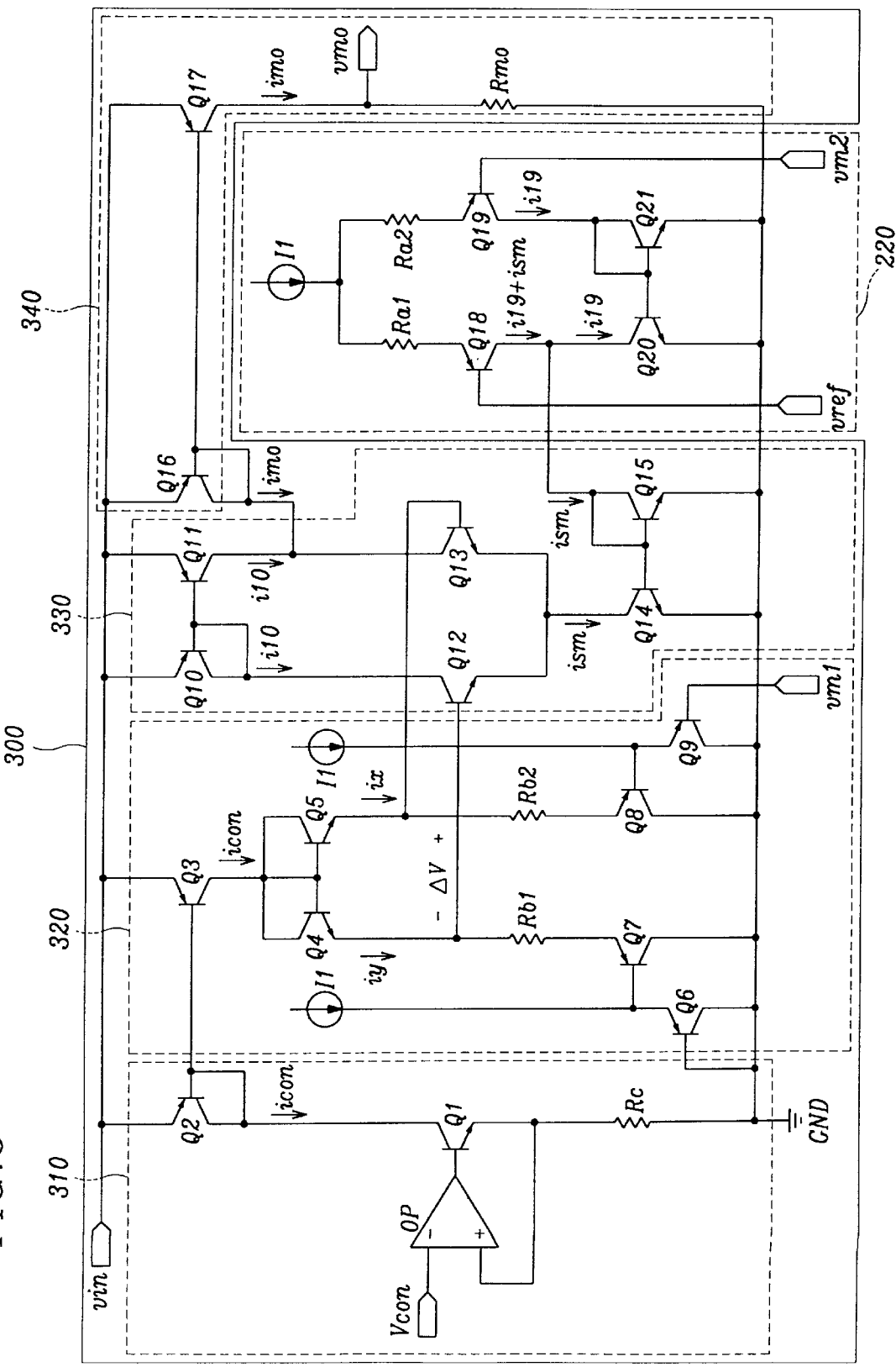
FIG. 6 illustrates a detailed schematic diagram of a calculator and a subtracter.

FIG. 6 shows a detailed circuit diagram of the calculator 300 and subtracter 220 of FIG. 3.

Referring to FIG. 6, the subtracter 220 comprises: pnp transistors Q18 and Q19, respectively, configuring a differential pair; resistors Ra1 and Ra2 coupled between the emitters of the transistors Q18 and Q19 and the current source 11, respectively; and npn transistors Q20 and Q21, the collector of the npn transistors Q20 and Q21 being coupled to the collector of the pnp transistors Q18 and Q19 and configuring a current mirror. The reference voltage Vref and the output voltage Vm2 of the error amplifier 210 of FIG. 3 are supplied to the bases of the transistors Q18 and Q19, respectively.

The calculator 300 comprises: a Vcon input unit 310; a first differential amplification unit 320; a second differential amplification unit 330; and a Vmo output unit 340.

The Vcon input unit 310 comprises: a pnp transistor Q2, the emitter of the pnp transistor Q2 being coupled to the input voltage Vin; an npn transistor Q1, the collector of the npn transistor Q1 being coupled to the base and collector of the pnp transistor Q2; an operational amplifier OP, the voltage Vcon of FIG. 3 being coupled to an inverting input terminal of the operational amplifier OP, and the emitter of the transistor Q1 being coupled to a noninverting input terminal of the operational amplifier OP, and the output of the operational amplifier OP being coupled to the base of the transistor Q1; and a resistor Rc coupled between the emitter of the transistor Q1 and the ground.

The first differential amplification unit 320 comprises: a pnp transistor Q3 configuring a current mirror together with the transistor Q2 of the Vcon input unit 310; npn transistors Q4 and Q5, with each base and collector of the transistors Q4 and Q5 being coupled to the collector of the transistor Q3; resistors Rb1 and Rb2, one end of each the resistors Rb1 and Rb2 being coupled to the emitter of the transistors Q4 and Q5, respectively; pnp transistors Q7 and Q8, each emitter of the transistors Q7 and Q8 being respectively coupled to the other end of the resistors Rb1 and Rb2, and configuring a differential pair; and pnp transistors Q6 and Q9, the emitters of the pnp transistors Q6 and Q9 being respectively coupled to the bases of the transistors Q7 and Q8, as well as to a current source 11. The ground voltage is supplied to the base of the transistor Q6, and the voltage Vm1 is supplied to the base of the transistor Q9.

The second differential amplification unit 330 comprises: pnp transistors Q10 and Q11, the each emitter of the transistors Q10 and Q11 being coupled to the input voltage Vin, and configuring a current mirror; npn transistors Q12 and Q13, the collectors of the transistors Q12 and Q13 being coupled to the collectors of the transistors Q10 and Q11, respectively, and configuring a differential pair; an npn transistor Q14, the collector of transistor Q14 being coupled to the emitters of transistors Q12 and Q13; and an npn transistor Q15, configuring a current mirror together with the transistor Q14. The difference voltage ΔV between the each emitter of the transistors Q4 and Q5 is supplied across the bases of the transistors Q12 and Q13, and the collector of the transistor Q15 is coupled to the common collectors of the transistors Q18 and Q20 of the subtracter 220.

The Vmo output unit 340 comprises: pnp transistors Q16 and Q17, the emitters of the transistors Q16 and Q17 being coupled to the input voltage Vin, and configuring a current mirror; and a resistor Rmo, coupled between the collector of the transistor Q17 and the ground. The collector and base of the transistor Q16 is coupled to the collector of the transistor Q13, and the voltage Vmo between the collector of the transistor Q17 and the resistor Rmo is coupled to the noninverting input terminal of the comparator 400 in FIG. 3.

Next, the current and voltage flowing to the transistors of the calculator and subtracter in FIG. 6 will be described.

The voltage Vmo provided to the noninverting input terminal of the comparator is shown by Equation 3:

$$\text{Vmo} = \text{imo} \cdot \text{Rmo} \qquad \text{Equation 3,}$$

where, imo is the current flowing to the collector of the transistor Q17.

Also, the current imo flows to the collector of the transistor Q16, configured as a current mirror together with the transistor Q17.

Since the transistors Q10 and Q11 configure a current mirror, the current i10 flows through each collector of the transistors Q10 and Q11. Therefore, the current imo+i10 flows through the collector of the transistor Q13, and the current i10 flows through the collector of the transistor Q12.

Because of the voltage difference ΔV supplied to the transistors Q12 and Q13, the current flowing through the transistor Q12 is different from that flowing through the transistor Q13. In this case, the current difference imo can be shown by Equation 4:

$$imo = ism \cdot \tanh\frac{\Delta V}{2V_T}, \qquad \text{Equation 4}$$

where, the ism is the current flowing through the collector of the transistor Q14, and equal to the sum of the current flowing through each emitter of the transistors Q12 and Q13 (i.e., i10+(i10+imo)), and $V_T$ is a thermal voltage.

Since transistors Q20 and Q21 configure a current mirror and the transistor Q19 is coupled to the transistor Q21 in series, the current i19 flows through the each collector of the transistors Q19, Q20, and Q21. Therefore, the current i19+ism flows through the collector of the transistor Q18.

By the Kirchihoff voltage law in the subtracter 220 of FIG. 6, following Equation 5 is obtained:

Vref+Vbe(Q18)+(i19+ism)·Ra1=i19·Ra2+Vbe(Q19)+Vm2 Equation 5, where, the Vbe(Q18) and Vbe(Q19) are the voltage between the base and emitter of the transistors Q18 and Q19, respectively.

If the Vbe(Q18) is assumed to be equal to Vbe(Q19), and if Ra1=Ra2 =Ra, Equation 6 is obtained from Equation 5.

$$ism = \frac{Vm2 - Vref}{Ra}. \qquad \text{Equation 6}$$

By using Equations 4 and 6, Equation 7 is found:

$$imo = \frac{Vm2 - Vref}{Ra} \cdot \tanh\frac{\Delta V}{2V_T}. \quad \text{Equation 7}$$

Because the emitter of the transistor Q1 is coupled to the noninverting input terminal of the operational amplifier OP, the collector voltage of the transistor Q1 is equal to the voltage Vcon of the inverting input terminal of the operational amplifier. Therefore, the current icon flowing to the emitter or the collector of the transistor Q1 is obtained as Equation 8:

$$icon = \frac{Vcon}{Rc}. \quad \text{Equation 8}$$

Since the transistors Q2 and Q3 configure a current mirror, the current flowing through the collector of the transistor Q3 is also equal to the current icon.

The current difference ix–iy between the current ix flowing through the emitter of the transistor Q5 and the current iy through the emitter of the transistor Q4 is obtained as Equation 9, with the same method for Equations 4 and 7:

$$ix - iy = icon \cdot \tanh\frac{\Delta V}{2V_T} = \frac{Vm1}{Rb}, \quad \text{Equation 9}$$

where, it is assumed that Rb1=Rb2=Rb. From Equations 8 and 9, Equation 10 is found:

$$\tanh\frac{\Delta V}{2V_T} = \frac{Vm1 \cdot Rc}{Rb \cdot Vcon}. \quad \text{Equation 10}$$

By substituting Equation 10 into Equation 7, Equation 11 is obtained:

$$imo = \frac{Vm2 - Vref}{Ra} \cdot \frac{Vm1 \cdot Rc}{Rb \cdot Vcon}. \quad \text{Equation 11}$$

From Equations 11 and 3, the output voltage Vmo is found by Equation 12:

$$Vmo = \frac{Vm2 - Vref}{Ra} \cdot \frac{Vm1 \cdot Rc \cdot Rmo}{Rb \cdot Vcon}. \quad \text{Equation 12}$$

From Equation 12 as shown by Equation 1, the output voltage Vmo of lo the calculator 300 is proportional to the voltage Vm1 and (Vm2–Vref), and inversely proportional to the voltage Vcon. That is, K in Equation 1 is $$K = \frac{Rc \cdot Rmo}{Ra \cdot Rb}.$$

Hence, according to the embodiment of the present invention, since the voltage Vm1 which detects the fluctuation quantity of the input voltage is compensated by the voltage Vcon which functions as feedforward, the output voltage of boost converter can be stably regulated with regard to the input voltage having rare limitation on the operation of the calcaulator.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A Power Factor correction (PFC) controller, comprising:

a converter including a transformer coupling the primary coil to input voltage, a switch controlling the current flowing to the primary coil, and a first diode and a first capacitor rectifying an output voltage of the primary coil and supplying the rectified voltage to a load;

an error amplification unit including an error amplifier amplifying the difference between a voltage proportional to an output voltage of the converter and a first reference voltage, and a subtracter subtracting an output voltage of the error amplifier from a second reference voltage;

a calculator receiving a first and a second input voltages proportional to the input voltage of the converter and an output voltage of the subtracter as inputs respectively, and outputting a voltage proportional to the first input voltage and the output voltage of the subtracter and inversely proportional to the second input voltage;

a comparator comparing a detection voltage which detects the current flowing to the switch with the output voltage of the calculator;

a zero current detection unit detecting the zero current of the secondary coil of the transformer;

a switching driver controlling the switch to ON or OFF responsive to the output voltage of the comparator and the output of the zero current detection unit;

wherein the subtracter comprises:
first and second transistors receiving the second reference voltage and the output voltage of the error amplifier through their respective bases, and configuring a differential pair;
first and second resistors coupled to between each emitter of the first and second transistors and a current source; and
third and fourth transistors in which the collectors of the third and fourth transistors are coupled to the collectors of the first and second transistors, respectively, and configure a current mirror.

2. The controller of claim 1, wherein the calculator comprises:

a fifth transistor in which the emitter is coupled to the supply voltage; a sixth transistor in which the collector is coupled to the base and collector of the fifth transistor; an operational amplifier in which one input terminal is coupled to a second input voltage, and the other input terminal is coupled to the emitter of the sixth transistor, and the output is supplied to the base of the sixth transistor; a third resistor coupled to between the emitter of the sixth transistor and the ground;

a seventh transistor configuring a current mirror together with the fifth transistor; eighth and ninth transistors in which the base and the collector of both are coupled to the collector of the seventh transistor; a fourth and fifth resistors in which each one end is coupled to the emitter of the eighth and ninth transistors, respectively; tenth and eleventh transistors in which the emitters are coupled to the other ends of the fourth and fifth resistors, respectively, and configure a differential pair, and the collectors are coupled to the ground and the first input voltage respectively; twelfth and thirteenth transistors in which the emitters are coupled to the bases of the tenth and eleventh transistors and the current source;

fourteenth and fifteenth transistors in which the emitters are coupled to the supply voltage, respectively, and configure a current mirror; sixteenth and seventeenth transistors in which the collectors are coupled to the collectors of the fourteenth and fifteenth transistors, respectively, configuring a differential pair, and receive the voltage difference between the emitters of the eighth and ninth transistors between their bases; an eighteenth transistor in which the collector is coupled to the emitter of the sixteenth and seventeenth transistors; a nineteenth transistor, configuring a current mirror together with the eighteenth transistor, in which the emitter is coupled to the common collectors of the first and third transistors of the subtracter;

twentieth transistor in which the emitter is coupled to the supply voltage, and the base and collector are coupled to the collector of the fifteenth transistor; twenty first transistor configuring a current mirror together with the twentieth transistor; sixth resistor coupled to between the collector of the twenty first transistor and the ground; and the voltage between the collector of the twenty first transistor and the sixth resistor is supplied to the comparator.

* * * * *